US010578115B2

(12) United States Patent
Lander et al.

(10) Patent No.: US 10,578,115 B2
(45) Date of Patent: Mar. 3, 2020

(54) COMPOSITE COMPONENT WITH HOLLOW REINFORCING PINS

(71) Applicant: ROLLS-ROYCE plc, London (GB)

(72) Inventors: James K Lander, Bristol (GB); Robert C Backhouse, Wells (GB)

(73) Assignee: ROLLS-ROYCE plc, London (GB)

( * ) Notice: Subject to any disclaimer, the term of this patent is extended or adjusted under 35 U.S.C. 154(b) by 325 days.

(21) Appl. No.: 15/496,410

(22) Filed: Apr. 25, 2017

(65) Prior Publication Data
US 2017/0335856 A1 Nov. 23, 2017

(30) Foreign Application Priority Data

May 19, 2016 (GB) .................................. 1608786.8

(51) Int. Cl.
F04D 29/02 (2006.01)
B32B 7/08 (2019.01)
B29C 70/02 (2006.01)
F04D 29/32 (2006.01)
F01D 5/28 (2006.01)
F01D 5/14 (2006.01)
F04D 29/38 (2006.01)
F04D 29/52 (2006.01)
F04D 29/54 (2006.01)
(Continued)

(52) U.S. Cl.
CPC .......... F04D 29/023 (2013.01); B29C 70/023 (2013.01); B32B 7/08 (2013.01); F01D 5/145 (2013.01); F01D 5/147 (2013.01); F01D 5/282 (2013.01); F04D 29/324 (2013.01); F04D 29/388 (2013.01); F04D 29/522 (2013.01); F04D 29/542 (2013.01); F04D 29/582 (2013.01); F04D 29/663 (2013.01); F04D 29/681 (2013.01); F02K 3/06 (2013.01); F05D 2230/80 (2013.01); F05D 2260/208 (2013.01); F05D 2260/213 (2013.01); F05D 2260/30 (2013.01); F05D 2300/603 (2013.01); F05D 2300/6032 (2013.01); F05D 2300/6033 (2013.01); Y02T 50/672 (2013.01); Y02T 50/676 (2013.01)

(58) Field of Classification Search
USPC ........................ 428/102, 104, 131, 137, 223
See application file for complete search history.

(56) References Cited

U.S. PATENT DOCUMENTS 3,286,786 A * 11/1966 Wirt ........................ F01D 25/30
                                                        181/213
3,378,228 A *  4/1968 Davies et al. ............ F01D 5/18
                                                        416/95
(Continued)

FOREIGN PATENT DOCUMENTS

CN         107953574 A  *  4/2018

OTHER PUBLICATIONS

Dec. 12, 2016 Search Report issued in British Patent Application No. 1608786.8.

Primary Examiner — Moshe Wilensky
Assistant Examiner — Topaz L. Elliott
(74) Attorney, Agent, or Firm — Oliff PLC

(57) ABSTRACT

A composite component comprising fibres embedded in a matrix material. A plurality of pins extend through the matrix material. Each pin of the plurality of pins comprises a hollow bore such that the bore of each pin defines a plurality of holes in the composite component.

15 Claims, 3 Drawing Sheets

(51) Int. Cl.
*F04D 29/58* (2006.01)
*F04D 29/68* (2006.01)
*F04D 29/66* (2006.01)
*F02K 3/06* (2006.01)

(56) References Cited

U.S. PATENT DOCUMENTS

| | | | | |
|---|---|---|---|---|
| 3,775,238 A * | 11/1973 | Lyman | | A47B 96/021 |
| | | | | 428/167 |
| 3,819,007 A * | 6/1974 | Wirt | | E04B 1/86 |
| | | | | 181/286 |
| 4,238,437 A | 12/1980 | Rolston | | |
| 4,256,525 A * | 3/1981 | Allen | | F16L 47/28 |
| | | | | 156/227 |
| 4,774,121 A | 9/1988 | Vollenweider, II | | |
| 4,786,343 A * | 11/1988 | Hertzberg | | B29C 65/48 |
| | | | | 112/423 |
| 4,789,577 A | 12/1988 | Leone et al. | | |
| 5,466,506 A * | 11/1995 | Freitas | | B29C 70/023 |
| | | | | 428/105 |
| 5,512,715 A * | 4/1996 | Takewa | | E04B 1/86 |
| | | | | 181/286 |
| 5,589,015 A * | 12/1996 | Fusco | | B32B 5/26 |
| | | | | 156/73.1 |
| 5,863,635 A * | 1/1999 | Childress | | B29C 65/5057 |
| | | | | 428/119 |
| 5,869,165 A * | 2/1999 | Rorabaugh | | B29C 70/24 |
| | | | | 428/105 |
| 6,106,646 A | 8/2000 | Fairbanks | | |
| 6,113,722 A * | 9/2000 | Hoffman | | B81C 99/0085 |
| | | | | 156/155 |
| 6,514,593 B1 | 2/2003 | Jones et al. | | |
| 6,607,798 B1 | 8/2003 | Watanabe et al. | | |
| 6,632,502 B1 * | 10/2003 | Allen | | B29C 70/446 |
| | | | | 428/119 |
| 7,008,689 B2 * | 3/2006 | Hawkins | | B32B 3/08 |
| | | | | 428/212 |
| 7,247,003 B2 * | 7/2007 | Burke | | F01D 5/147 |
| | | | | 416/229 A |
| 7,311,175 B2 * | 12/2007 | Proscia | | F01D 25/30 |
| | | | | 181/214 |
| 7,409,757 B2 * | 8/2008 | Hall | | B29C 65/08 |
| | | | | 29/407.01 |
| 7,658,590 B1 * | 2/2010 | Spanks | | B82Y 30/00 |
| | | | | 29/458 |
| 7,866,939 B2 * | 1/2011 | Harper | | B64D 33/02 |
| | | | | 415/119 |
| 8,100,662 B2 * | 1/2012 | Schreiber | | B29C 70/202 |
| | | | | 416/230 |
| 8,205,654 B2 * | 6/2012 | Choi | | B29C 66/001 |
| | | | | 156/289 |
| 8,556,579 B2 * | 10/2013 | Jevons | | F01D 5/20 |
| | | | | 415/173.4 |
| 8,741,090 B2 * | 6/2014 | Goehlich | | B29C 65/5035 |
| | | | | 156/251 |
| 8,852,473 B1 * | 10/2014 | Tan | | B29C 44/3461 |
| | | | | 264/241 |
| 8,893,367 B2 | 11/2014 | Lander | | |
| 8,920,115 B2 * | 12/2014 | Wadewitz | | B29C 70/24 |
| | | | | 415/182.1 |
| 9,562,443 B2 * | 2/2017 | Roberts | | B29C 70/882 |
| 9,993,983 B2 * | 6/2018 | Nishimura | | B29C 73/04 |
| 10,385,869 B2 * | 8/2019 | M'Membe | | F01D 5/282 |
| 2003/0021628 A1 * | 1/2003 | Gudaitis | | F16B 5/01 |
| | | | | 403/408.1 |
| 2004/0121138 A1 * | 6/2004 | Carstensen | | B32B 5/18 |
| | | | | 428/304.4 |
| 2004/0149197 A1 | 8/2004 | Maklezow | | |
| 2011/0027526 A1 | 2/2011 | McCarville et al. | | |
| 2011/0217166 A1 * | 9/2011 | McMillan | | F01D 5/147 |
| | | | | 415/229 |
| 2013/0276459 A1 * | 10/2013 | Roberts | | F01D 5/005 |
| | | | | 60/805 |
| 2013/0340239 A1 * | 12/2013 | Ueda | | F16B 19/086 |
| | | | | 29/525.06 |
| 2014/0193249 A1 * | 7/2014 | Roberts | | B29C 70/882 |
| | | | | 415/200 |
| 2015/0260208 A1 * | 9/2015 | Baker | | B21J 15/147 |
| | | | | 403/282 |
| 2015/0308290 A1 * | 10/2015 | Kappes | | F01D 25/24 |
| | | | | 415/119 |
| 2016/0003106 A1 * | 1/2016 | Fouquet | | B32B 18/00 |
| | | | | 427/255.12 |
| 2016/0115086 A1 * | 4/2016 | Tuertscher | | C04B 35/573 |
| | | | | 264/29.1 |
| 2016/0159036 A1 * | 6/2016 | Humfeld | | B29C 66/721 |
| | | | | 428/223 |
| 2016/0221273 A1 | 8/2016 | Foresto et al. | | |
| 2017/0261002 A1 * | 9/2017 | M'Membe | | F01D 5/282 |
| 2018/0178489 A1 * | 6/2018 | M'Membe | | B32B 7/08 |
| 2019/0071363 A1 * | 3/2019 | Li | | C04B 35/80 |

\* cited by examiner

COMPOSITE COMPONENT WITH HOLLOW REINFORCING PINS

TECHNICAL FIELD

The present disclosure concerns a composite component and/or a gas turbine engine.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core.

The fan comprises an array of radially extending fan blades mounted on a rotor. The fan blades and/or a casing that surrounds the fan may be manufactured from metallic and/or composite (e.g. non-metallic) materials. In composite fan blades, the blades may include a composite body and a metallic leading edge and a metallic trailing edge.

Composite components are often laminate structures that include a plurality of plies. Each ply generally includes reinforcing fibres (e.g. high strength or high stiffness fibres) embedded in a matrix, e.g. a plastic matrix material. The matrix material of adjacent stacked plies is bonded together to build the composite component. The matrix material is weaker than the fibre material and as such the bond between stacked plies can form a point of weakness. This means that a primary failure mechanism of concern for composite materials is delamination.

Delamination for example of a fan blade may occur in the event of an impact by a foreign object such as a bird strike.

To reduce the risk of delamination of a composite component through thickness reinforcement can be used. One type of through thickness reinforcement is pinning (which may be referred to as z-pinning). A component that has been pinned includes a plurality of pins (or rods) extending through the thickness of the component in a direction transverse to the general direction of the plies.

Pins are generally made of a composite material (e.g. carbon embedded in a resin matrix) and typically have a diameter ranging from or equal to approximately 0.2 mm to 1 mm.

Often, composite pins are manufactured by pultrusion of a carbon fibre tow impregnated by a thermoset resin. The pins of a composite component exert a bridging force on the plies to hold the plies in position relative to each other; this reduces opening of inter-laminar cracks (known as mode I failure) and sliding displacements of inter-laminar cracks (known as mode II failure).

SUMMARY

In an aspect there is provided a composite component comprising fibres embedded in a matrix material and a plurality of pins extending into and/or within the matrix material. Each pin of the plurality of pins comprises a hollow bore such that the bore of each pin defines a hollow pathway in the composite component.

The composite component may be an organic matrix composite or a ceramic matrix composite or a metal matrix composite.

The fibres embedded in a matrix material may be defined by a plurality of plies.

One or more of the plurality of pins may extend in a direction parallel to the plies of material.

One or more of the pins may extend transversely through the plies.

The pins may be arranged such that the bore of each pin defines a plurality of holes in the composite component.

Any of the described aspects may have one or more of the following optional features.

The pins may extend through the plies in a direction such that an angle between the pins and the direction of the plies is equal to or greater than 5 degrees and equal to or less than 90 degrees to the direction of the plies.

At least some of (or all of) the pins may extend through the entire thickness of the matrix material. For example, at least some of (or all of) the pins may extend through every ply (i.e. through the entire thickness of a laminate portion of the component), e.g. so as to define a plurality of through thickness holes in the component.

At least some of (or all of) the pins may partially extend through the matrix material. For example, at least some of (or all of) the pins extend through only some of the plies (i.e. through a partial depth of a laminate portion of the component), e.g. so as to define a plurality of recesses in the surface of the component.

At least some of (or all of) the pins may be fully embedded within the matrix material.

The bore of each pin may define a flow channel through the component. For example, the flow channel may be for cooling or heating fluid (e.g. air) flow through the component.

The component may be a fan blade, a casing, or a vane for a gas turbine engine.

The composite component may be a marine component, for example a component of a flooding cavity, e.g. hydrofoils, ducts. In such embodiments the pins may be utilised to provide a mechanism to equalise pressure by permitting flow through a distribution of hollow pins. In alternative embodiments the composite component may be a blade, rotor, or duct for the marine industry. In such examples the hollow pins may help to prevent cavitation.

The component may be a blade or a vane. The pins may be arranged such that the holes defined by the bores of the pins modify the boundary layer of flow over the component when the component is used in a gas turbine engine.

When the component is a casing, the holes defined by the bores of the pins may be arranged to reduce noise when the casing is in use on a gas turbine engine.

The bores of the pin may define cooling flow channels through the component.

The component may be a vane and the bores of the pins may define flow channels of a heat exchanger.

In an aspect there is provided a gas turbine engine comprising the component according to any one of the previous aspects.

In an aspect there is provided a method of repairing a composite component according to any one of the previous aspects, the method comprising injecting a material through the bores of the pins so as to deliver a repair material to a desired location of the blade.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
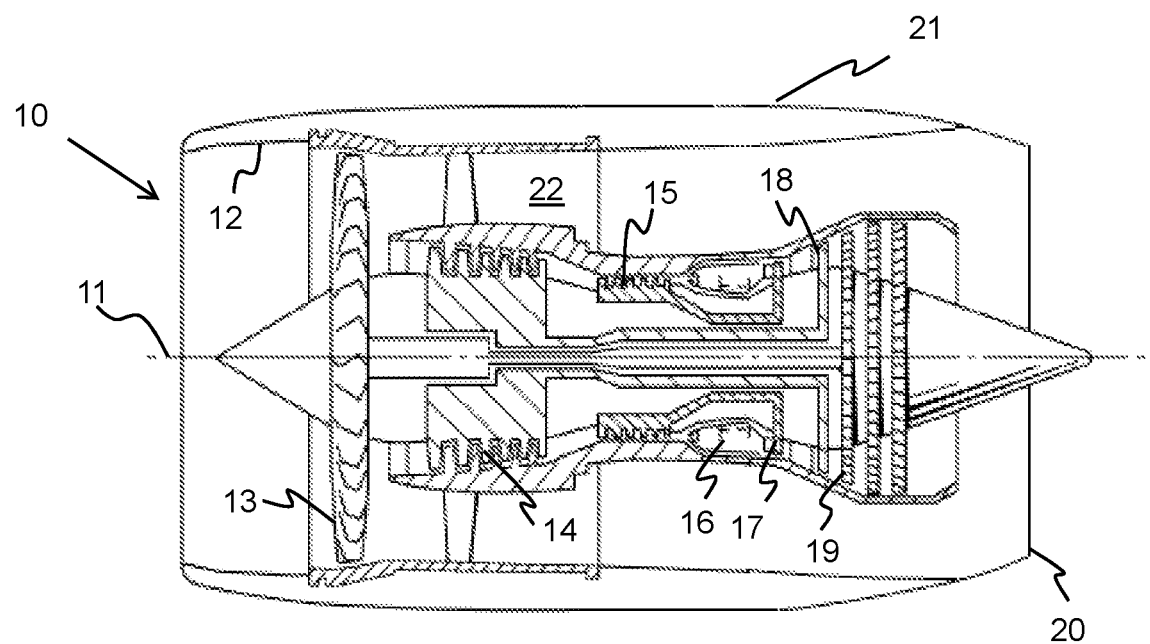
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The intake fan 12 comprises an array of radially extending fan blades 40 that are mounted to the shaft 26. The shaft 26 may be considered a hub at the position where the fan blades 40 are mounted. The fan blades are surrounded by a fan casing 39, which may be made from a composite material.

Figure 2:
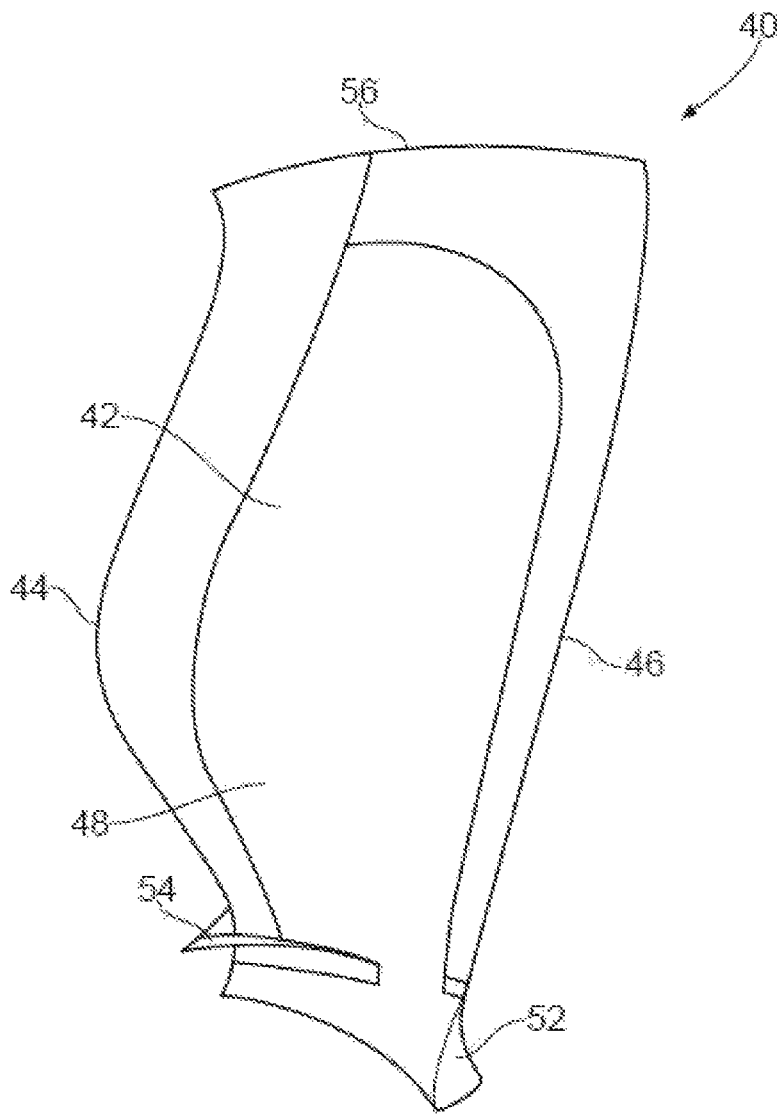
FIG. 2 is a perspective view of a fan blade.

Referring to FIG. 2, the fan blades 40 each comprise an aerofoil portion 42 having a leading edge 44, a trailing edge 46, a concave pressure surface wall 48 extending from the leading edge to the trailing edge and a convex suction surface wall extending from the leading edge to the trailing edge. The fan blade has a root 52 via which the blade can be connected to the hub. The fan blade has a tip 56 at an opposing end to the root. The fan blade may also have an integral platform 54 which may be hollow or ribbed for out of plane bending stiffness. The fan blade includes a metallic leading edge and a metallic trailing edge. The remainder of the blade (e.g. the body of the blade) is made from composite material.

Figure 3:
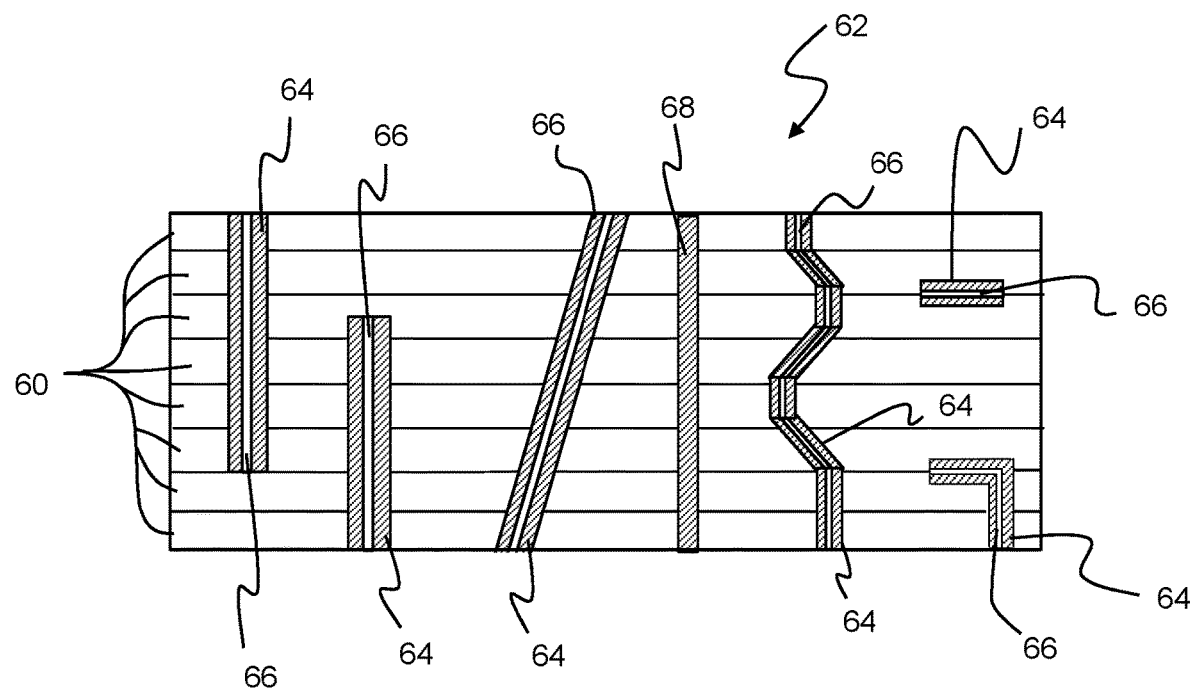
FIG. 3 is a cross sectional schematic view of a laminate that is reinforced with pins and may define part of the blade of FIG. 2.

Referring to FIG. 3, the composite material includes a laminate 60 having a plurality of plies 62. A plurality of pins 64, 68 are provided in the laminate. The laminate 60 includes hollow pins (or tubular pins) 64 and non-hollow pins (or cylindrical or prism pins) 68, however in alternative embodiments all the pins may be hollow. The plurality of pins 64, 68 may be made from a metallic material. The non-hollow pins are provided for the function of reinforcing the laminate. The hollow pins may be provided to perform the function of reinforcing the laminate and/or may provide an additional function as will be described in more detail later.

As illustrated in FIG. 3, the pins 64, 68 may be arranged transversely to the plies, e.g. substantially perpendicular to the plies, or angled by a different angle, e.g. 45° to the plies. Alternatively, the pins 64 may be arranged parallel to the plies. When the pins are arranged to be transverse to the plies, the pins may be arranged to extend through the full thickness of a component (or laminate), or through the partial thickness of a component, and/or a component may have pins extending from one surface of the component or from opposing surfaces of the component. One or more of the transverse and/or parallel pins may be embedded within the laminate.

Figure 4:
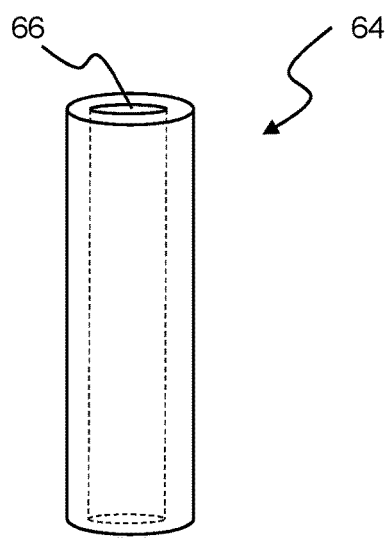
FIG. 4 is a perspective view of a pin of the laminate of FIG. 3.

Referring to FIG. 4, the hollow pin 64 includes a bore 66 that extends through the length of the pin. When the hollow pin 64 is positioned in a laminate, the bore 66 defines a hollow pathway (or cavity) through (including fully or partially through) the laminate. In the present example the pin has a circular cross section. However, in alternative embodiments the pin may have any suitably shaped cross section.

Referring back to FIG. 3, the hollow pins can be used to perform various different functions. For example, the pins that extend partially through the thickness of the laminate and/or the parallel pins and/or the embedded pins may be used to deliver "healing" material to a location of the laminate to repair a fault in the laminate. Faults or flaws may occur during use of the component or during the manufacturing process.

The component may be a blade or a vane, and the hollow pins 64 may be arranged to extend partially through the thickness or fully through the thickness of the laminate. The hollow pins may be arranged so as to modify the boundary layer of the vane or blade.

The component may be a casing, e.g. a fan casing, and the hollow pins 64 may be arranged to extend partially through the thickness or fully through the thickness of the laminate. The hollow pins may be arranged so as to reduce noise.

The component may be a vane and the pins 64 may be provided to cool or heat the vanes. For example, a fluid, e.g. air from the compressor, may be directed through the vanes via the bores 66 of the pins. In such examples, the pins may be used to define a heat exchanger in the vane. In examples where the pins define a heat exchanger it may be desirable for the pins to define a non-linear path. An example of such a path is illustrated in FIG. 3. In the example shown in FIG. 3 the path is defined by a number of sub-pins arranged to define an overall pin, with a bore extending through the overall pin. A further alternative pin illustrated in FIG. 3 includes a pin that is parallel to the ply direction.

Defining holes in the laminate using hollow pins rather than, for example drilling a hole in the laminate, which means that the integrity of the laminate reinforcement fibres can be maintained and stress concentrations can be reduced.

Conventionally pins would only be used for reinforcement, there is generally no secondary function intended for the pins. However, in the present disclosure it is proposed that pins are modified (i.e. made hollow) so as to perform a primary function or secondary function other than reinforcement.

In embodiments where pins are provided parallel to the plies, the pins may form part of the laminar reinforcement at a lower density because they are hollow and having improved resistance to buckling in compression due to their cross sectional shape.

Further, the pins may be used for fluid flow or pressurisation along the laminar plane of the component, and/or the pins may be used as a suitable pathway or protection for services such as fibre optic sensors or other instrumentation.

To manufacture the laminate shown in FIG. 3, the plies may be laid using conventional methods, for example sheet lay up or automated fibre placement. Before the laminate is cured (or fully cured), the pins 64 may be inserted into the laminate 62 of the composite component using an ultrasonic hammer or using the method described in U.S. Pat. No. 8,893,367 which is incorporated herein by reference. When the pin is defined by a plurality of sub-pins, the pins may be inserted at stages throughout the ply lay-up process. Alternatively, the laminate may be made from sub-components bonded or cured together. In the case of resin infused components the pins may be assembled within a preform and the resin matrix of the laminate may be infused subsequently.

The hollow pins have been described as being used in components made from organic matrix composite materials but in alternative embodiments the hollow pins may be used in ceramic matrix composites, or metal matrix composites.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A composite component that is a blade or a vane of a gas turbine engine exposed to a fluid flow during operation, the composite component comprising:
   a plurality of stacked plies including fibres embedded in a matrix material; and
   a plurality of pins extending into or within the matrix material in a direction transverse to the plurality of stacked plies, each pin of the plurality of pins including a hollow bore defining a hollow pathway in the composite component, the plurality of pins being arranged such that, during operation of the gas turbine engine, holes defined by the bores of the plurality of pins modify a boundary layer of flow over the composite component.

2. The composite component according to claim 1, wherein the plurality of pins extend through the plurality of stacked plies in a direction such that an angle between the plurality of pins and a direction of the plurality of stacked plies is equal to or greater than 5 degrees and equal to or less than 90 degrees to the direction of the plurality of stacked plies.

3. The composite component according to claim 1, wherein at least some of the plurality of pins extend through an entire thickness of the matrix material.

4. The composite component according claim 1, wherein at least some of the plurality of pins partially extend through the matrix material.

5. The composite component according to claim 1, wherein the plurality of pins are made from a fibre reinforced resin.

6. The composite component according to claim 1, wherein the plurality of pins are made from a metallic material.

7. A gas turbine engine comprising the component according to claim 1.

8. A composite component that is a vane, the composite component comprising:
   a plurality of stacked plies including fibres embedded in a matrix material; and
   a plurality of pins extending into or within the matrix material in a direction transverse to the plurality of stacked plies, each pin of the plurality of pins including a hollow bore defining a hollow pathway in the composite component, the bores of the plurality of pins define flow channels of a heat exchanger.

9. The composite component according to claim 8, wherein the plurality of pins extend through the plurality of stacked plies in a direction such that an angle between the plurality of pins and a direction of the plurality of stacked plies is equal to or greater than 5 degrees and equal to or less than 90 degrees to the direction of the plurality of stacked plies.

10. The composite component according to claim 8, wherein at least some of the plurality of pins extend through an entire thickness of the matrix material.

11. The composite component according claim 8, wherein at least some of the plurality of pins partially extend through the matrix material.

12. The composite component according to claim 8, wherein the plurality of pins are made from a fibre reinforced resin.

13. The composite component according to claim 8, wherein the plurality of pins are made from a metallic material.

14. A gas turbine engine comprising the component according to claim 8.

15. A method of repairing a composite component including (i) a plurality of stacked plies including fibres embedded in a matrix material, and (ii) a plurality of pins extending into or within the matrix material in a direction transverse to the plurality of stacked plies, each pin of the plurality of pins including a hollow bore defining a hollow pathway in the composite component, the bore of each pin of the plurality of pins defining cooling flow channels through the composite component, the method comprising:
   injecting a material through the bores of the plurality of pins so as to deliver a repair material to a desired location of the composite component.

* * * * *